Jan. 12, 1943.                F. W. MEREDITH                2,307,941
                 AUTOMATIC CONTROL APPARATUS FOR AIRCRAFT
                    Filed July 7, 1939          3 Sheets-Sheet 1

Frederick W. Meredith
By
Watson, Cole, Grindle & Watson
ATTYS.

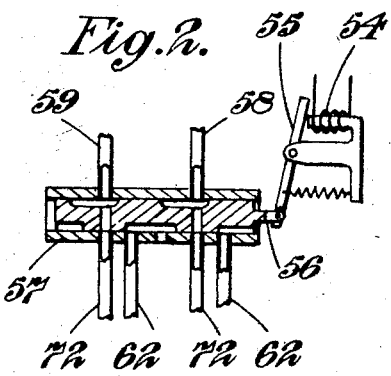
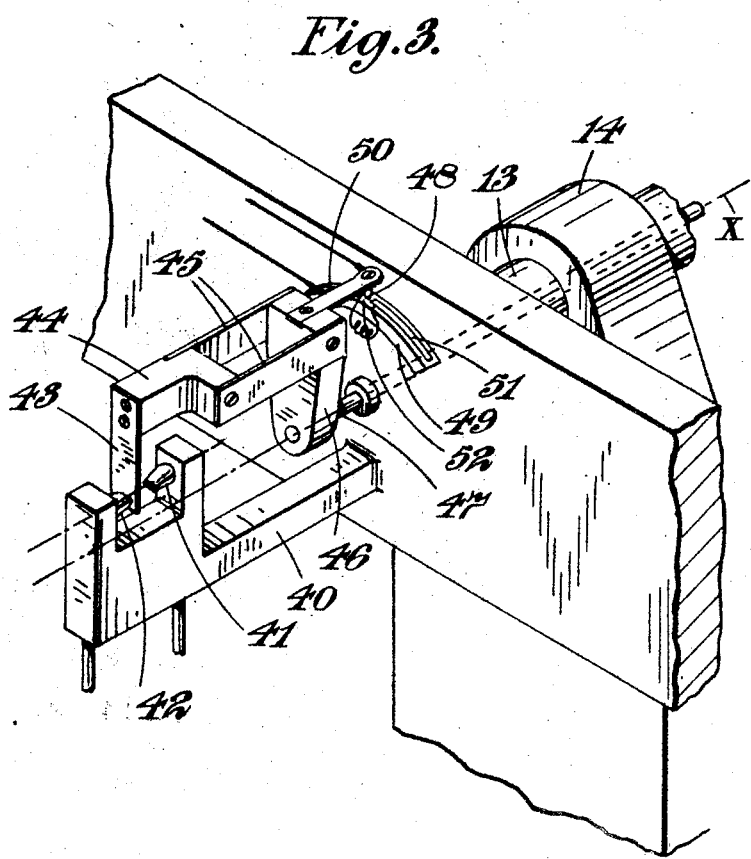

Patented Jan. 12, 1943

2,307,941

UNITED STATES PATENT OFFICE 2,307,941

AUTOMATIC CONTROL APPARATUS FOR AIRCRAFT

Frederick William Meredith, London, England, assignor to S. Smith & Sons (Motor Accessories) Limited, London, England, a British company Application July 7, 1939, Serial No. 283,314
In Great Britain July 13, 1938

14 Claims. (Cl. 244—79)

This invention relates to automatic control apparatus for aircraft and is concerned with such control apparatus having an azimuth gyroscope or other turn indicator controlling the rudder of the aircraft, together with means for changing the course. The object of the present invention is to provide an improvement of such apparatus such as to enable banked turns to be performed in a simple manner.

According to the present invention there is provided a control apparatus for aircraft comprising means for detecting turn of the aircraft in azimuth and controlling the course of the aircraft according to detected turn in order to maintain a given course (e. g. by control of the rudder), means for changing the course and means responsive to lateral acceleration or side-slip operating said means for changing course for the purpose of control of the lateral acceleration or side-slip when the craft is banked. Thus, with the apparatus in operation, in order to change course it is only necessary to bank the craft to the desired angle and the rudder or the like will be automatically actuated to suppress side-slip and a correctly banked turn will be performed.

According to a feature of the invention means is provided for displacing the datum of the means responsive to lateral acceleration or sideslip.

According to another feature of the invention bank setting means for the purpose of effecting a turn is coupled with the said means for displacing the datum of the means responsive to lateral acceleration or side-slip.

A further feature of the invention consists in that the means for changing course is also operated by bank setting means.

Another feature of the invention consists in the provision of means controlled by the bank setting means for rendering said course changing means inoperative for the purpose of ensuring straight flight.

In one construction the means for detecting the turn of the aircraft comprises an azimuth gyroscope controlling a servo-motor for actuating the rudder and having precessing means, which precessing means is controlled by the means responsive to lateral acceleration or sideslip.

In another construction the means for detecting turn of the aircraft comprises an azimuth gyroscope controlling a servo-motor for actuating the rudder, with the provision of follow-up mechanism, and the follow-up mechanism is adjustable under the control of the means responsive to lateral acceleration or side-slip.

Specific embodiments of the invention are illustrated diagrammatically by way of example in the accompanying drawings, in which:

Figures 2 and 3 are detail views of the apparatus shown in Figure 1, and

Figure 1:
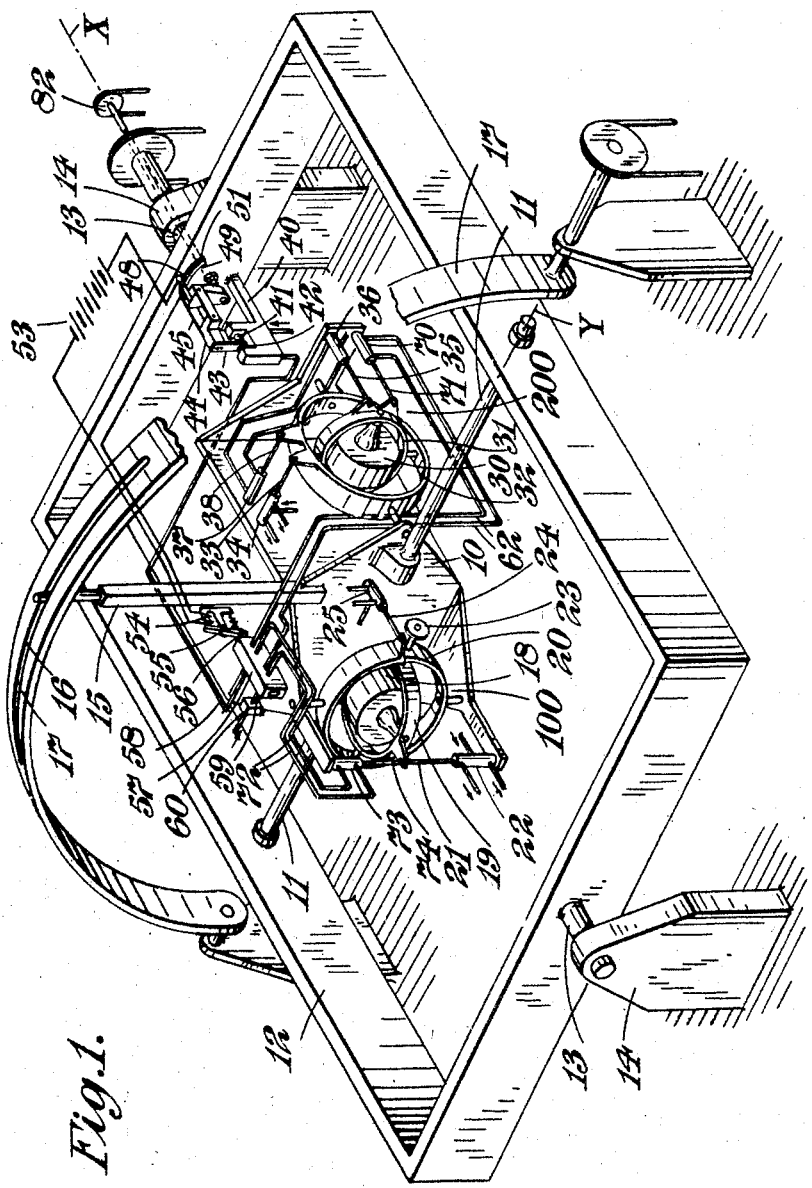
Figure 1 is a general view of a gyroscopic control apparatus for aircraft.

Referring to Figures 1 to 3 of the drawings, a platform 10 is pivotally mounted by spigots 11 in a frame 12 for rotation about a normally horizontal axis Y. The frame 12 is rotatably mounted by means of spigots 13 located in bearings 14 fixed in the aircraft such that the axis X, about which the frame 12 can turn, is horizontal and lengthwise of the craft. The platform 10 is guided for movement about the axis Y by a column 15 engaging in a slot 16 in an arcuate guide 17 pivoted about an axis which coincides with the Y axis when the frame 12 is in the horizontal position.

The platform 10 carries a gyroscope 100 for controlling the craft in pitch, this gyroscope comprising a rotor 18 whose axis of spin is horizontal and lies fore-and-aft of the craft. The rotor 18 is carried in bearings in a gimbal ring 19 arranged horizontally and in turn pivotally mounted in an outer gimbal ring 20 which is rotatable about a vertical axis on the platform 10. The inner gimbal ring 19 is connected by a link 21 to a valve 22 which controls a supply of air under pressure to a servo-motor, not shown, for adjusting the elevator of the aircraft in known manner. The outer gimbal ring 20 is unbalanced by a weight 23 and it is connected by a link 24 to a valve 25 controlling a supply of air under pressure to a servo-motor, not shown, for operating the rudder in known manner.

Also mounted on the platform 10 is a gyroscope 200 for controlling the ailerons of the aircraft. This gyroscope comprises a rotor 30 whose axis of spin is horizontal and lies transversely of the aircraft. The rotor is carried in bearings in an inner gimbal ring 31, the plane of which also lies transversely of the aircraft and this inner gimbal ring is pivotally mounted in an outer gimbal ring 32 which is pivoted for movement about a fore-and-aft horizontal axis on the platform 10. The outer gimbal ring 32 is connected by a link 33 to a valve 34 controlling the supply of air under pressure to a servo-motor, not shown, for operating the ailerons of the aircraft. The inner gimbal ring 31 is connected by a link 35 to a detecting valve 36 for controlling the air supply to a precessing motor 37 mounted on the platform 10. This motor operates on the outer gimbal ring 32 through a link 38.

On the frame 12 there is a bracket 40 carrying a delivery nozzle 41 for air under pressure and opposite to it a receiving nozzle 42. A blade 43 movable between these nozzles controls the air pressure in the conduit leading from the nozzle 42. The blade 43 is mounted on a weight 44 which is carried by means of springs 45 connected to a member 46 mounted on a spindle 47 rotatable in the frame 12 about the X axis. The member 46 also carries an electric contact brush 48 cooperating with a commutator 49 on the frame 12, this frame having interconnected contacts 50 and 51 separated by an insulating section 52. The brush 48 normally rests on this insulating section.

The brush 48 is connected through a battery indicated at 53 to one terminal of an electromagnet 54 of which the other terminal is connected to the contacts 50 and 51. An armature 55 controlled by the magnet 54 is connected to the spindle 56 of a change-over valve 57.

The valve 57 has an inlet 58 which is connected to the nozzle 42 and another inlet 59 to which air under pressure is applied through a reducing valve 60. According to the position of the blade 43 between the nozzles 41 and 42 the air pressure applied from the nozzle 42 to the valve varies within a range extending above and below the pressure applied at the inlet 59. The valve has outlets 62 leading to a bank trimming motor 70 carried on the platform 10 and having an operating link 71 connected to the inner gimbal ring 31 of the gyroscope 200. The valve has other outlets 72 leading to an azimuth precessing motor 73 having an operating link 74 connected to the inner gimbal ring 19 of the rudder and elevator gyroscope 100. In the energised position of the magnet 54 the movable element 63 of the valve is in such position as to connect the inlets 58 and 59 to the precessing motor 73 and in the de-energised position the trimming motor 70. The blade 43 has one edge normally lying across the centre of the nozzle 41 so that the difference in pressure at the inlets 58 and 59 of the valve has a zero value at the normal position and an increasing value upon relative movement of the blade and the nozzles and depending in sign upon the direction of this relative movement.

By means of the apparatus according to this invention the control of the aircraft in pitch and roll is effected by means such as the pulley and cable 80 for turning the platform about the X axis, and another pulley and cable 81 for turning the platform about the Y axis. By rotation of the platform 10 about the Y axis it is displaced from its horizontal position in the aircraft so as to produce by means of the gyroscope 100 a corresponding change in the elevational direction of the aircraft. Similarly, by rotation of the platform 10 about the X axis, displacing it from the horizontal position in the aircraft, there is produced a control of the aircraft in bank.

By turning the frame about the X axis, the relative displacement of the platform 10 and the outer gimbal ring 32 of the gyroscopic device 200 operates the valve 34 for producing an adjustment of the ailerons to bring the platform 10 back to the normal horizontal position by banking the aircraft. This banking of the aircraft produces side-slip which is detected by the weight 44 displacing the blade 43 with respect to the nozzles 41 and 42. The air pressure in the conduit 58 leading from the nozzle 42 will thus be increased or decreased as the case may be. Since the frame 12 has been turned in the aircraft the circuit of the magnet 54 is energised through the brush 48 and one of the contacts 50, 51, so that the valve 57 applies the air pressures at the inlets 58 and 59 to the azimuth precessing motor 73. The motor transmits a torque to the inner gimbal ring 19, causing the rotor to precess. The resulting precessional movement of the outer gimbal ring 20 operates the valve 25 to energise the servo-motor for moving the rudder to turn the aircraft in such a sense as to limit the side-slip causing the said displacement of the blade 43.

Thus the weight 44, its associate jets 41 and 42 and the azimuth precessing motor 73 together form a governor to control the extent of side-slip. In the operation of the apparatus as thus far described, there will be a side-slip associated with any turn and proportional to the rate of the turn. To reduce this error, as shown in Figure 3, the line of the jets 41 and 42 is displaced above the axis of rotation of the frame 12, so that when the frame 12 is inclined about its axis X, to initiate a turn, the jets are displaced relative to the blade 43 even though the side-slip is zero.

In straight flight the contact 48 is open and the pressure difference in the conduits 58 and 59 is applied to the bank trimming motor 70 for the purpose of ensuring correct levelling of the platform 10 about the axis X. Thus if the platform 10 is slightly tilted about the X axis the blade 43 is displaced relative to its associated jets and the pressure in the conduit 58 is no longer equal to pressure in the conduit 59 and so that the motor 70 applies a torque to the inner gimbal ring 31, so as to precess the outer gimbal ring 32 to change the attitude of the craft until the platform 10 is correctly levelled about the X axis.

By adjustment of the pitch control 81 the platform 10 is displaced relative to the gyroscope 100 about the axis of the inner gimbal ring and the consequential relative movement of this inner gimbal ring and the platform 10 controls the valve to produce a movement of the elevators to tilt the craft so that the platform is returned to the horizontal position. If however the platform 10 is slightly tilted about the Y axis the weight 23 applies a torque to the outer gimbal ring 20 which precesses the inner gimbal ring 19 thus changing the attitude of the craft until the platform is correctly levelled about the Y axis.

It will thus be appreciated that the platform 10 on which the gyroscopic devices are mounted is always returned to the horizontal position regardless of the trim of the aircraft so that in the case of each gyroscope the axis of precession during a turn is maintained vertical and thus lies in the same vertical plane as the rotor axis.

The bracket 46 which carries the electric contact brush 48 is mounted on a spindle 47 which is normally fixed with respect to the frame 12. It may, however, be rotated through a pulley 82 and cable for producing a flat turn of the aircraft, in which case the pulley 80 is held fixed.

In other respects the gyroscopes 100 and 200 perform their well known functions, operating in the known manner for the control of the rudder and elevators and the control of the ailerons respectively, for instance, as described in Great Britain Patent No. 365,186 and United States Patent No. 1,992,086.

It will be understood that known means may be employed to provide a follow-up from each servo-motor to its associated valve although for clarity such follow-up means are omitted in the drawings.

The rudder of the aircraft is controlled by the gyroscope 100 which detects turn of the aircraft in azimuth. In the construction above described, change of course is effected by the precessing motor 73 which is automatically actuated by the means responsive to lateral acceleration consisting of the sprung-weight 44 and its associated jets.

Figure 4:
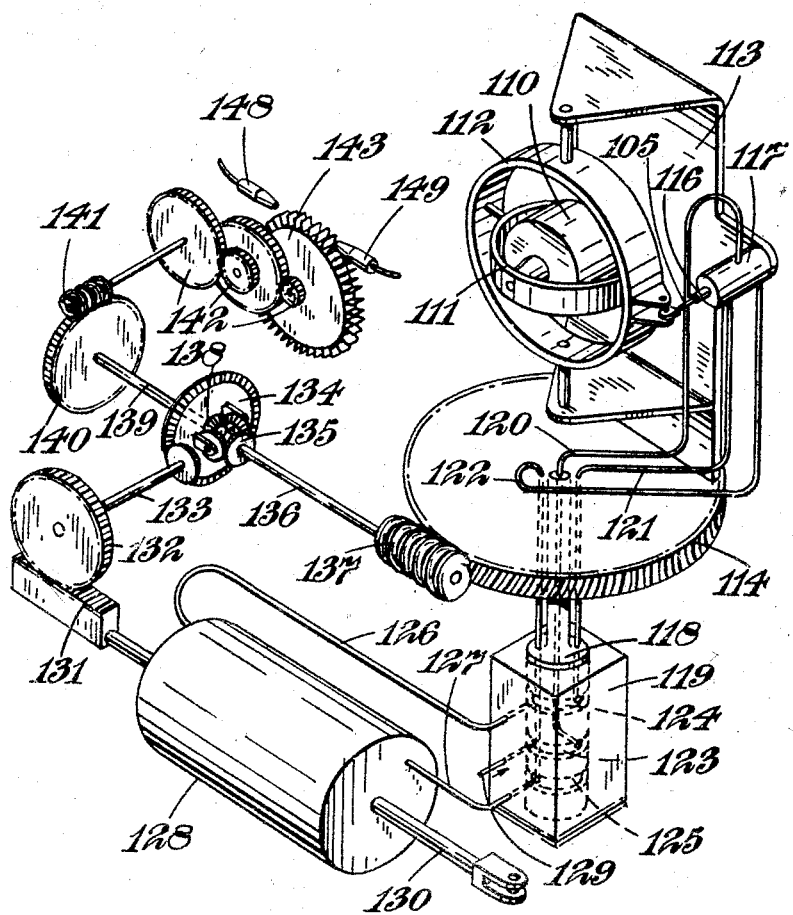
Figure 4 shows a modified construction of the apparatus.

In an alternative construction as shown in Figure 4, the change of course is effected by rotation of the frame in which the gyroscope is mounted.

Referring to Figure 4, there is shown an azimuth gyroscope for control of course which has a rotor 110 arranged with its axis of spin horizontal and mounted to rotate in a horizontal gimbal ring 111 which is in turn pivotally mounted in an azimuth or outer gimbal ring 112. The outer gimbal ring 112 is rotatably mounted in a bracket 113 rigid with a worm-wheel 114 and is connected by means of a link 115 to a piston valve 116 movable in a valve cylinder 117 carried by the bracket 113.

The worm-wheel 114 is carried on a cylindrical distributing member 118 rotatably mounted in a block 119 which is fixed in the aircraft. An inlet pipe 120 and outlet pipes 121 and 122 for the valve cylinder 117 pass into the distributing member 118 and communicate respectively with peripheral grooves 123, 124 and 125 therein. Pipes 126 and 127 carried in the block 119 communicate with the grooves 124 and 125 respectively and serve to apply air under pressure to opposite ends of a servo-motor cylinder 128, the air under pressure being supplied through a pipe 129 to the peripheral groove 123 of the distributor. The piston rod 130 of the servo-motor is coupled to the rudder for its automatic control.

To provide a follow-up the piston rod 130 carries a rack 131 meshing with a gear-wheel 132. The gear-wheel 132 is mounted on a spindle 133 in driving engagement with the planetary system 134 of a differential gear. One element 135 of this gear is mounted on a spindle 136 carrying a worm 137 meshing with the worm-wheel 114 so that assuming the other element 138 of the differential gear to be fixed a follow-up is obtained by rotation of the worm-wheel 114.

The element 138 of the differential gear is mounted on a spindle 139 carrying a worm-wheel 140 with which meshes a worm 141. The worm 141 is driven through a reduction gear train 142 by an air driven rotor 143 which is driven by air jets from two nozzles 148 and 149 arranged so as to cause the air to impinge on the blades of the rotor 143 in the directions tending to rotate the rotor in opposite directions. The difference in air pressure applied to these two nozzles is controlled by means sensitive to lateral acceleration, for example, in the same way as the pressure difference in the lines 72 (Figure 1) is controlled by the sprung-weight 44 and its associated jets. In this case the change-over valve 57 may be electrically operated under the control of contacts such as contacts 48, 50 and 51 (Figure 1) so arranged as to be operative as hereinbefore described when it is desired to bank the aircraft.

In use of the apparatus the gyroscope controls the rudder through the servo-motor 128 and maintains the aircraft on its course. The follow-up mechanism which includes the differential gear element 135 and planetary system 134 is displaced by rotation of the other element 138 of the differential gear. Should lateral acceleration or side-slip occur, a difference in air pressure is produced at the nozzles 148 and 149 due to the action of the pendulum 44 and the rotor 143 is driven in a direction depending upon the direction of side-slip. The rotor 143 thus drives through the reduction gear 142 and worm-wheel 141 and 140 the element 138 of the differential gear, to displace the follow-up, as aforesaid. In this manner, the rudder is actuated to suppress lateral acceleration or side-slip when the craft is banked for the purpose of making a turn. Thus, to change the course of the aircraft it is only necessary to bank the craft to the reqired angle and the rudder will be automatically actuated to suppress side-slip and a correctly banked turn will be performed.

It will be understood that the invention is not limited to the specific constructions hereinbefore described which may be modified, for example, by the use of means other than a sprung-weight for detecting lateral acceleration or side-slip of the aircraft.

I claim:

1. Control apparatus for aircraft comprising means for controlling the course of the aircraft, means for detecting turn of the aircraft in azimuth, means controlled by said detecting means and connected to act on said course control means to maintain a given course, means for changing course, said course changing means being connected to actuate said course control means, and means responsive to lateral acceleration and connected to actuate said course changing means for controlling lateral acceleration when the aircraft is banked.

2. Control apparatus for aircraft comprising means for controlling the rudder of the aircraft, means for detecting turn of the aircraft in azimuth, means controlled by said detecting means and connected to act on said rudder control means to maintain a given course, means for changing course, said course changing means being connected to actuate said rudder control means, and means responsive to lateral acceleration and connected to actuate said course changing means for controlling lateral acceleration when the aircraft is banked.

3. Control apparatus for aircraft comprising means for controlling the course of the aircraft, means for detecting turn of the aircraft in azimuth, means controlled by said detecting means and adapted to actuate said course control means to maintain a given course, means for changing course, said course changing means being connected to actuate said course control means, means responsive to lateral acceleration, constructed for displacement from a datum and connected to actuate said course changing means for controlling lateral acceleration when the aircraft is banked, and means for displacing the datum of said means responsive to lateral acceleration.

4. Control apparatus for aircraft comprising means for controlling the course of the aircraft, means for detecting turn of the aircraft in azimuth, means controlled by said detecting means and adapted to actuate said course control means to maintain a given course, means for changing course, said course changing means being connected to actuate said course control means, bank setting means for effecting a banked turn, means responsive to lateral acceleration, constructed for displacement from a datum and connected to actuate said course changing means for controlling lateral acceleration when the aircraft is banked, and means coupling said bank setting means to said means for displacing said datum.

5. Control apparatus for aircraft comprising means for controlling the course of the aircraft, means for detecting turn of the aircraft in azimuth, means controlled by said detecting means and adapted to actuate said course control means to maintain a given course, means for changing course, said course changing means being connected to actuate said course control means, bank setting means for effecting a banked turn, means responsive to lateral acceleration, constructed for displacement from a datum and connected to actuate said course changing means for controlling lateral acceleration when the aircraft is banked, and means coupling said bank setting means to said means for displacing said datum, said bank setting means being connected to actuate said course changing means.

6. In combination with the apparatus defined in claim 4, means connected for control by said bank setting means for rendering said course changing means inoperative for ensuring straight flight.

7. In combination with the apparatus defined in claim 5, means connected for control by said bank setting means for rendering said course changing means inoperative for ensuring straight flight.

8. Control apparatus for aircraft comprising a rudder, an azimuth gyroscope and associated means for detecting turn, means including a servo-motor connected to said turn detecting means for actuating said rudder, follow-up mechanism for said servo-motor, and means responsive to lateral acceleration connected for automatically adjusting said follow-up mechanism to control the lateral acceleration when the aircraft is banked.

9. A control apparatus for aircraft having a vertical rudder, comprising means for detecting turn of the aircraft in azimuth, means controlled by said means for detecting turn to operate the rudder to maintain a given course, means for changing said course, bank setting means for controlling the aircraft in roll, and means responsive to lateral acceleration or side-slip operating said means for changing course to control lateral acceleration or side-slip when the aircraft is banked, whereby a turn of the aircraft is effected by operation of said bank setting means.

10. A control apparatus for aircraft having a vertical rudder, comprising means for detecting turn of the aircraft in azimuth, means controlled by said means for detecting turn to operate the rudder to maintain a given course, bank setting means for controlling the aircraft in roll, means for changing said course, means operated by said bank setting means to render the means for changing course operative, and means responsive to lateral acceleration or side-slip operating said means for changing course to control the lateral acceleration or side-slip when the aircraft is banked by said bank setting means, whereby a turn of the aircraft is effected by operation of said bank setting means.

11. A control apparatus for aircraft having a vertical rudder, comprising means for detecting turn of the aircraft in azimuth, means controlled by said means for detecting turn to operate the rudder to maintain a given course, means for changing said course, bank setting means for controlling the aircraft in roll, means responsive to lateral acceleration or side-slip operating said means for changing course for controlling lateral acceleration or side-slip when the aircraft is banked, and means controlled by the bank setting means for rendering said means for changing course inoperative for straight flight.

12. A control apparatus for aircraft having a vertical rudder, comprising an azimuth gyroscope for detecting turn of the aircraft, a servo-motor for actuating the rudder of the aircraft, means controlled by said gyroscope according to said detected turn for controlling said servo-motor, precessing means for said gyroscope to vary its datum for detected turn, bank setting means controlling the aircraft in roll, and means responsive to lateral acceleration or side-slip controlling said precessing means to reduce lateral acceleration or side-slip by the application of rudder when the aircraft is banked, whereby a banked turn of the aircraft is effected by control of said bank setting means.

13. A control apparatus for aircraft having a vertical rudder, comprising an azimuth gyroscope for detecting turn of the aircraft, a servo-motor for actuating the rudder of the aircraft, means controlled by said gyroscope according to detected turn for controlling said servo-motor, a follow-up mechanism for said servo-motor, which follow-up mechanism is adjustable to vary the datum for detected turn, bank setting means for controlling the aircraft in roll, and means responsive to lateral acceleration or side-slip for automatically adjusting said follow-up mechanism to reduce the lateral acceleration or side-slip when the aircraft is banked, whereby a banked turn of the aircraft is effected by control of said bank setting means.

14. A course controlling apparatus for an aircraft comprising an adjustable course setting device, a rudder control, means for detecting turn of the aircraft in azimuth and associated with said rudder control to maintain the course initially set by said setting device, a banking control, a side slip detector operatively connected with said adjustable course setting device, and arranged to set it to a new course in accordance with the side slip occasioned when the banking control is operated, the rudder thus being moved by said turn detecting means in an endeavor to maintain the initial course and to correct deviation produced by banking.

FREDERICK WILLIAM MEREDITH.